United States Patent
Harmon

(10) Patent No.: US 11,144,807 B2
(45) Date of Patent: Oct. 12, 2021

(54) TRANSACTION CARDS WITH TACTILE FEATURES AND METHODS OF MAKING AND USING THEREOF

(71) Applicant: Capital One Services, LLC, McLean, VA (US)

(72) Inventor: Eldon Harmon, Lorton, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/598,633

(22) Filed: Oct. 10, 2019

(65) Prior Publication Data

US 2021/0110227 A1    Apr. 15, 2021

(51) Int. Cl.
*G06K 19/06* (2006.01)
*G06K 19/077* (2006.01)

(52) U.S. Cl.
CPC ............... *G06K 19/0772* (2013.01)

(58) Field of Classification Search
CPC ... G06K 19/04; G06K 19/06; G06K 19/06046
USPC .................. 235/492, 487, 494
See application file for complete search history.

(56) References Cited

U.S. PATENT DOCUMENTS

| | | | | |
|---|---|---|---|---|
| 5,169,155 | A * | 12/1992 | Soules | A63F 1/02 156/277 |
| 5,334,823 | A * | 8/1994 | Noblett, Jr. | G06Q 20/00 235/380 |
| 6,398,115 | B2 * | 6/2002 | Krause | G06K 7/084 235/380 |
| 7,654,578 | B2 * | 2/2010 | Reinhart | B42D 25/29 283/72 |
| 10,083,383 | B1 * | 9/2018 | Herrington | G06K 19/07747 |
| 2006/0255155 | A1 * | 11/2006 | Cranston | B42D 25/00 235/488 |
| 2008/0267047 | A1 * | 10/2008 | King | G11B 7/24012 369/275.1 |
| 2011/0115211 | A1 * | 5/2011 | Feneyrou | B42D 25/24 283/74 |
| 2016/0068702 | A1 * | 3/2016 | Lin | G09B 21/00 428/143 |
| 2017/0050459 | A1 * | 2/2017 | Tiguy | B42D 25/324 |
| 2017/0144470 | A1 * | 5/2017 | Freudenberger | G06K 15/1209 |
| 2019/0172055 | A1 * | 6/2019 | Hale | G07F 7/0893 |

* cited by examiner

*Primary Examiner* — Daniel St Cyr
(74) *Attorney, Agent, or Firm* — Greenberg Traurig, LLP

(57) ABSTRACT

In some embodiments, a product includes a card having a front face, a back face and a payment-enabling mechanism, where the front face is opposite to the back face. Account information is disposed on the front face, the back face, or both, in a tactile writing system, as well as one or more card identification texture strips. The one or more card identification texture strips each comprise at least one region having a texture pattern different from a base texture of the card, where the texture pattern comprises a roughness texture pattern, and where the texture pattern is unique to an issuer of the card.

20 Claims, 4 Drawing Sheets

TRANSACTION CARDS WITH TACTILE FEATURES AND METHODS OF MAKING AND USING THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF TECHNOLOGY

The present disclosure generally relates to transaction cards, such as, but not limited to, credit cards, transaction cards, debit cards and any other type of transaction cards having tactile features, and methods of making such payment instruments.

BACKGROUND OF TECHNOLOGY

Transaction cards, such as credit cards, transaction cards, debit cards, gift cards, and other cards used for payments or other transactions typically are made from a monolithic piece of material, such as plastic or metal. The faces of each side of the card typically has a smooth surface, sometimes with raised letters or numbers to identify account information. However, such cards don't provide tactile features and, for example, may be difficult for those with visual impairments to identify and use, for example, if the card issuer or account information is not readily identifiable by means other than sight.

SUMMARY

In some embodiments, a product includes a card having a front face, a back face and a payment-enabling mechanism, where the front face is opposite to the back face; account information disposed on the front face, the back face, or both, in a tactile writing system; and one or more card identification texture strips disposed on the front face, the back face, or both. The one or more card identification texture strips each comprise at least one region having a texture pattern different from a base texture of the card, the texture pattern comprises a roughness texture pattern, and the texture pattern is unique to an issuer of the card.

In some embodiments, a product includes a card having a front face, a back face and a payment-enabling mechanism, where the front face is opposite to the back face. Two card identification texture strips are disposed on the card, where the two card identification texture strips each comprise a region of the front face, the back face, or both, the region having a texture pattern different from a base texture of the card, and the texture pattern comprises a roughness texture pattern and is unique to an issuer of the card.

In some embodiments, a method for making a product includes etching a texture pattern into one or more regions on a front face, a back face or both, of a card to form one or more card identification texture strips, where the texture pattern includes a roughness texture pattern, is different from a base texture of the card, and is unique to an issuer of the card, and where the one or more card identification texture strips extend across a width of the card. The method further including embossing a tactile writing system on the front face, the back face, or both, where the tactile writing system comprises account information associated with the card.

BRIEF DESCRIPTION OF THE DRAWINGS

Various embodiments of the present disclosure can be further explained with reference to the attached drawings. The drawings shown are not necessarily to scale, with emphasis instead generally being placed upon illustrating examples of the present disclosure. Therefore, specific structural and functional details disclosed herein are not to be interpreted as limiting, but merely as examples for teaching one skilled in the art to variously employ one or more example embodiments.

DETAILED DESCRIPTION

Various detailed example embodiments of the present disclosure, taken in conjunction with the accompanying figures, are disclosed herein; however, it is to be understood that the disclosed embodiments are merely examples. In addition, the examples given in connection with the various example embodiments are intended only as examples that are not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references.

FIG. 1 through 4 relate to embodiments of an example transaction card with tactile markings. A transaction card, according to some example embodiments, uses texturing and/or tactile writing to facilitate identification of a particular card to a user by touch. Thus, the user may not need not see the card and the identifying features thereon, but may rather, e.g., feel the texturing to identify the card from amongst other cards, and feel the tactile writing system to ascertain the card information, such as account information and user information. The texture and the tactile writing system may be configured to facilitate easy recognition of the card and card information without interfering with payment-enabling mechanisms, such as, e.g., EMV chips, radio frequency identification (RFID) chips, magnetic stripes, or any other type of payment enabling mechanisms.

Figure 1:
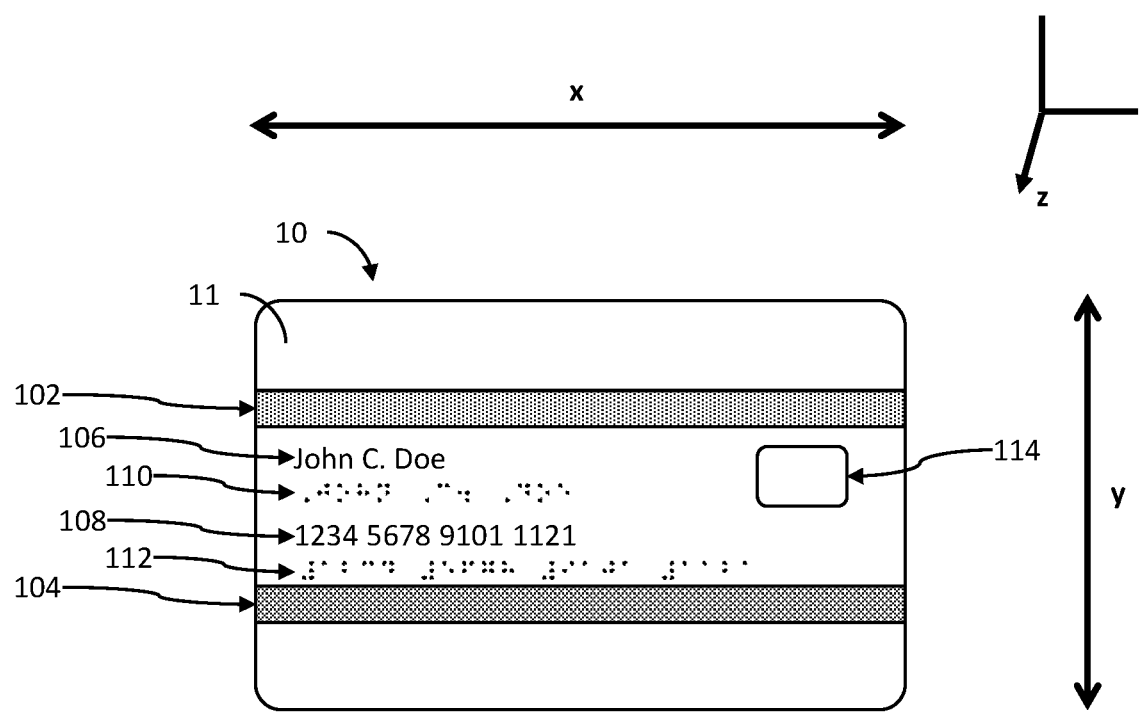
FIGS. 1-4 show one or more schematic diagrams and/or illustrations that depict some example aspects of at least some embodiments of the present disclosure.

FIG. 1 illustrates a diagram of a transaction card with tactile identifying features in accordance with one or more example embodiments.

According to an example embodiment, a transaction card 10 may have a front face 11 and a payment enabling mechanism 114, such as, e.g., an EMV chip on the front face 11. The transaction card 10 may also include account information, e.g., an account holder identifier 106, an account number 108, etc., among other possible information related to the transaction card 10, such as, card issuer, bank, credit service, expiration data, security number, issuance date, among other information.

In an example embodiment, the front face 11 may include a tactile writing system in place of, or in addition to the visually represented account holder identifier 106 and/or account number 108. Thus, in an example embodiment, the transaction card 10 includes a tactile account holder identifier 110, a tactile account number 112, or both, each represented in the tactile writing system. The tactile writing system can include a way of writing that is readily understandable by touch for those that have learned to read it. Thus, the tactile writing system can include any method of encoding language, such as the English language and/or numbers, in a fashion that is decodable through touching the tactile writing system. For example, in an embodiment, the tactile writing system can include Braille, Moon type, triangular alphabet, Night writing, Decapoint, among other tactile alphabets.

In an example embodiment, the tactile writing system can be embossed into the front face 11 such that symbols of the tactile writing system are formed by depressing portions of the transaction card 10 into the transaction card 10 beyond the front face 11 while leaving a pattern corresponding to the symbols of the tactile writing system with a height that aligns tops of the symbols with the plane of the front face 11. Thus, the symbols are pressed into the transaction card 10 to form the three-dimensional shape. Alternatively, however, the symbols can have raised shapes on the front face 11 of the transaction card 10, so that the shapes rise above the front face 11. Other methods of forming tactile symbols of a tactile writing system are contemplated.

In some example embodiments, a visually legible writing of an account holder identification 106 and a tactile account holder identification 110 may be directly adjacent to each other, or may be separate from each other. In other embodiments, the account holder identification 106 and the tactile account holder identification 110 may be at least partially co-located such that the tactile account holder identification 110 is disposed in a same region as the account holder identification 106. Similarly, in some embodiments, the account number 108 and the tactile account number 112 may be at least partially co-located, adjacent to each other, or separate from each other.

To facilitate ease of reading, in an example embodiment, the account holder identification 106 and/or the account number 108 may have a size readable with a finger of an individual. Possible sizes may include an equivalent to, e.g., a 12 point font (e.g., about ⅙ inches in height of an x character), or about 10 point font, or about 8 point font. In an example embodiment, the tactile account holder identification 110 and/or the tactile account number 112 can include Braille at a Marburg Medium size, e.g., about 10 millimeters (mm) (about 0.4 inches) with line space of about 10 mm, with each dot having a height above the front face 11 of about 0.48 mm (about 0.019 inches) and a base diameter of about 1.44 mm (about 0.057 inches). Other sizes or measurements may be used. In some example embodiments, to facilitate fitting information on the front face 11, the tactile writing system may include symbols that each occupy an area equivalent to, e.g., about 12 point font, about 10 point font, or about 8 point font, or other suitable size to fit on the transaction card 10 while maintaining readability, as measured by a height of a cell of Braille dots.

In an example embodiment, to facilitate a user quickly and easily identifying the transaction card 10 from amongst a plurality of other transaction cards 10, the front face 11 (or the back face 22, or both the front face and the back face) may include an upper texture strip 102 or a lower texture strip 104, or both that have textures different from a base texture of card. In some embodiments, upper and/or lower texture strips 102 and 104 are each formed from a texture used to identify the transaction card 10. The texture can be defined by one or more of various attributes related to deviations from the plane formed by the front face 11 of the transaction card 10. For example, the texture can include a degree of roughness, a degree of waviness, a lay, and patterns of variation thereof across the upper and lower texture strips 102 and 104. Herein, the term roughness refers to total spaced surface irregularities with respect to the front face. The surface irregularities can include a size in each of the width x, height y and thickness z dimensions, as well as a density of surface irregularities, each of which can be varied to adjust roughness. Herein, the term waviness refers to surface irregularities with a spacing greater than that of surface roughness, such as, e.g., warps, deflections, waves, among other surface irregularities covering a larger area than the surface irregularities causing roughness. Similar to roughness, the waviness can be characterized by a size in each of the width x, height y and thickness z dimensions, as well as a density of the surface irregularities. Herein, the term lay refers to a direction of a predominant surface pattern, including, e.g., a patterned arrangement caused by roughness, waviness, or both.

In some embodiments, a texture defined by waviness is formed in the upper and lower texture strips 102 and 104, and then a surface roughness is formed on top of the waviness. For example, a longitudinally extending bump can extend across the texture strips 102 and 104 in the height y direction. A series of such bumps can be formed across the width x direction of the texture strips 102 and 104 to form waves. The waves can then be roughened with surface irregularities smaller than the bumps to incorporate two types of textures with height y oriented lay in the texture strips 102 and 104.

According to some embodiments, the texture can include a pattern in the roughness, waviness or lay, or combinations thereof. For example, the above described waviness from longitudinal bumps can be in a periodic pattern defined by the spacing of the bumps across the texture strips 102 and 104 in the width x direction, while the surface roughness can include zig-zag arrangements of surface irregularities to produce texture strips 102 and 104 having a compound texture pattern. However, in some embodiments, the texture can include a uniform distribution of surface irregularities to provide a texture defined by roughness according to the size, shape and density of the surface irregularities. Other combinations of surface roughness, waviness and lay are contemplated to provide texture strips 102 and 104 that uniquely identify the transaction card 10 by touch.

In some embodiments, to facilitate easy recognition by touch, the texture strips 102 and 104 have a same texture pattern that is defined by surface roughness, and not waviness or lay. While defining texture by just one of surface roughness, waviness and lay reduces the degrees of freedom for uniquely identifying a card, it also reduces complexity, making the texture easier to identify. Thus, in some embodiments, the texture strips 102 and 104 are textured to identify, e.g., the card issuer, such as, e.g., an issuing bank or financial services organization. Thus, a user can quickly and easily identify the transaction card 10 as "the Capital One™" card in the user's selection of cards.

However, in some embodiments, the texture strips 102 and 104 can be textured based on, e.g., a type of card, such as a credit card, debit card, gift card, or other transaction card. In some embodiments, the texture strips 102 and 104 are personalized such that every transaction card 10 in the user's selection has a unique texture configuration according to the texture strips 102 and 104. Thus, the texture of the texture strips 102 and 104 may be unique to a user's selection of transaction cards 10, even though the texture may not be unique to all transaction cards 10 of all users. Furthermore, the user may customize the texture according to a desired texture pattern. For example, a user may prefer a surface roughness forming, e.g., spirals or concentric circles, on one transaction card 10, and, e.g., squares or diamonds on another.

In some embodiments, the upper texture strip 102 and the lower texture strip 104 may include the same or different textures. The combination of a texture of the upper texture strip 102 and a texture of the lower texture strip 104 may be used to identify the transaction card 10. However, in some embodiments, to facilitate quickly finding the transaction card 10, both the upper texture strip 102 and the lower texture strip 104 may have a same texture with a same pattern of texture elements, e.g., surface roughness, waviness and lay. Where the upper texture strip 102 and the lower texture strip 104 have the same texture, the texture for the transaction card 10 can be easily determine irrespective of an orientation of the transaction card 10, e.g., in a user's wallet, bag or pocket.

In some embodiments, to further facilitate quick and easy discovery of the texture strips 102 and 104, and thus quick and easy identification of the transaction card 10, the upper and lower texture strips 102 and 104 can have dimensions in the width x and height y that are configured to provide easy detections and sufficient space to discern the texture patterns relative to the front face 11 using, e.g., one finger. For example, some embodiments include an upper texture strip 102 and/or lower texture strip 104 extending across an entirety of the front face 11 with a width is the width in a y direction of a suitable size for tactile identification of the upper texture strip 102 and/or lower texture strip 104 against front face 11 using, e.g., one finger. Examples of the width may include a width in the range of between, e.g., about 1/10 inch and about 2 inches. However, other sizes are contemplated such that the texture strips 102 and 104 do not interfere with the tactile account holder identifier 110, tactile account number 112 or the payment enabling mechanism 114. For example, because the texture can include a waviness and/or surface roughness, a texture strip overlapping the payment enabling mechanism 114 may obstruct the use of the payment enabling mechanism 114 during a payment action. Thus, the texture strips 102 and 104 may have a size and location that does not overlap with the payment enabling mechanism 114. The width x and height y of each of the upper and lower texture strips 102 and 104 may be the same or they may be different. In some embodiments, there is only an upper texture strip 102. In some embodiments there is only a lower texture strip 104. In some embodiments, there is a third, fourth, fifth, or other suitable number of texture strips in addition to the upper and lower texture strips 102 and 104.

Moreover, the texture strips 102 and 104 and the textures thereof may have a size and location that fits within a card reader that uses the payment enabling mechanism 114 to complete a transaction upon a payment action, such as insertion of the transaction card 10 into the card reader, such as, e.g., an automated teller machine (ATM), point-of-service terminal with a chip reader or magnetic strip reader, or other card reading device.

In some embodiments, there is only one texture strip, such as, e.g., only the upper texture strip 102, only the lower texture strip 104, or a texture strip that is centrally located. While the texture strips 102 and 104 are depicted as extending across the transaction card 10 in a length direction x, other embodiments include texture strips that extend across the transaction card 10 in a height y direction. Other orientations and combinations of orientations of the texture strips are contemplated to facilitate quick and efficient recognition of the identifying texture. Moreover, while the front face 11 is depicted as having all of the upper texture strip 102, account holder identifier 106, tactile account holder identifier 110, account number 108, tactile account number 112, lower texture strip 104 and payment enabling mechanism 114, some or all of these features may be disposed on a back face, opposite to the front face 11, or may not be present at all.

Figure 2:
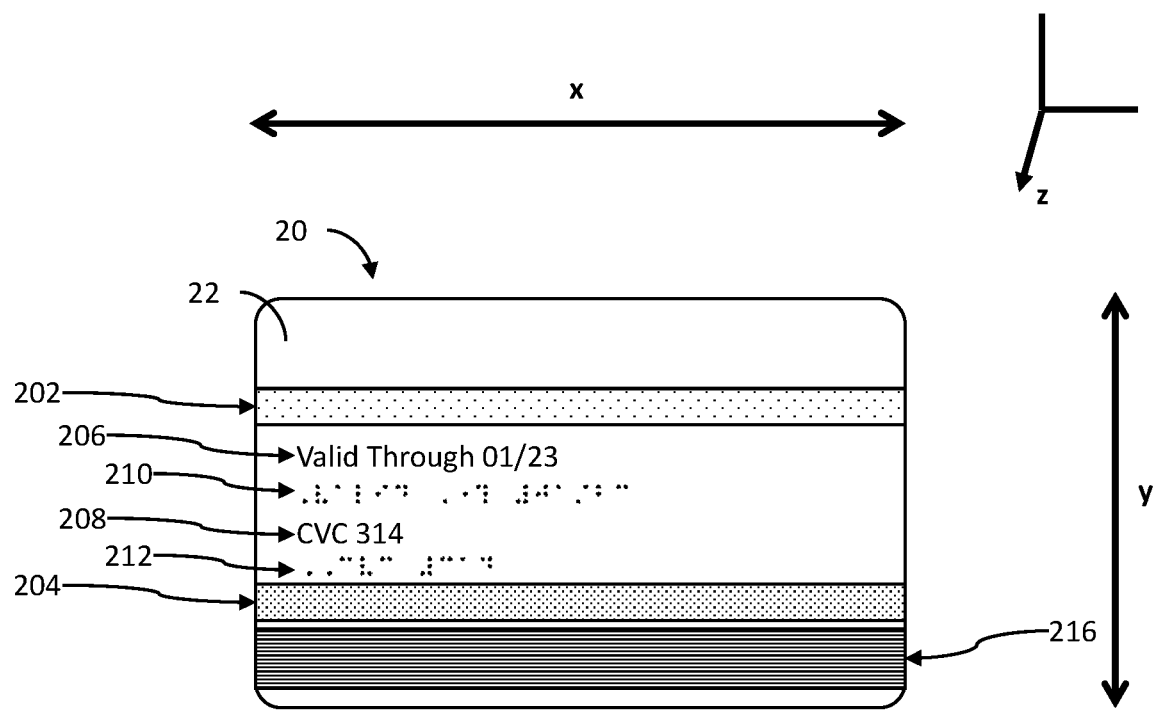

FIG. 2 illustrates a diagram of a transaction card with tactile identifying features in accordance with one or more example embodiments.

According to an embodiment of the present disclosure, a transaction card 20 may have a back face 22 and a payment enable mechanism 216, such as, e.g., a magnetic stripe on the back face 22. The transaction card 20 may also include account information, e.g., an expiration date identifier 206 and a security code 208, among other possible information related to the transaction card 20, such as, card issuer, bank, credit service, account holder identifiers, account numbers, issuance date, among other information.

However, because, e.g., the expiration date identifier 206, such as a date at which the transaction card 20 expires, and the security code 208 are legibly printed on the back face 22, a user or card owner with a visual impairment may not be able to ascertain the information contained therein. For example, an account owner may need to use the security code 208 for an online or over the phone purchase. In another example, a merchant or cashier may need the expiration date identifier 206 and the security code to complete a transaction.

In an embodiment, the back face 22 may include a tactile writing system in place of, or in addition to the visually represented expiration date identifier 206 and security code 208. Thus, in an embodiment, the transaction card 20 includes a tactile expiration date identifier 210 and a tactile security code 212, each represented in the tactile writing system. The tactile writing system is a way of writing that is readily understandable by touch for that that have learned to read it. Thus, the tactile writing system can include any method of encoding language, such as the English language and numbers, e.g., the expiration date identifier 206 and the security code 208, in a fashion that is decodable purely through touching the tactile writing system. For example, in an embodiment, the tactile writing system include Braille, Moon type, triangular alphabet, Night writing, Decapoint, among other tactile alphabets.

In an embodiment, the tactile writing system used for the tactile expiration date identifier 210 and the tactile security code 212 includes a set of three dimensional shapes. Each symbol of the tactile expiration date identifier 210 and the tactile security code 212 can have a length and width across the back face 22 relative to a width x and height y of the transaction card 20, as well as a height above a plane formed by the back face 22 relative to a thickness z of the transaction card 20. Thus, the tactile writing system can include two-dimensional shape in the width x and height y directions that is offset to a certain thickness z from the back face 22. For example, the tactile writing system can be embossed into the back face 22 such that the symbols of the tactile writing system are formed by depressing portions of the transaction card 10 into the transaction card 10 beyond the back face 22 while leaving a pattern corresponding to the symbols of the tactile writing system with a height that aligns tops of the symbols with the plane of the back face 22. Thus, the symbols are pressed into the transaction card 10 to form the three-dimensional shape. Alternatively, however, the symbols can be printed onto the back face 22 of the transaction card 10 to raise shapes above the back face 22. Other methods of forming tactile symbols of a tactile writing system using a three-dimensional shape are contemplated.

However, to facilitate a user quickly and easily identifying the transaction card 20 from amongst a plurality of other transaction cards 20, the back face 22 may also include an upper texture strip 202 or a lower texture strip 204, or both that have textures different from a base texture of the back face 22 outside of the upper and lower texture strips 202 and 204. In some embodiments, the upper and lower texture strips 202 and 204 are each formed from a texture used to identify the transaction card 20. The texture can be defined by one or more of various attributes related to deviations from the plane formed by the back face 22 of the transaction card 20. For example, the texture can include a degree of roughness, a degree of waviness, a lay, and patterns of variation thereof across the upper and lower texture strips 202 and 204. Herein, the term roughness refers to total spaced surface irregularities with respect to the front face. The surface irregularities can include a size in each of the width x, height y and thickness z dimensions, as well as a density of surface irregularities, each of which can be varied to adjust roughness. Herein, the term waviness refers to surface irregularities with a spacing greater than that of surface roughness, such as, e.g., warps, deflections, waves, among other surface irregularities covering a larger area than the surface irregularities causing roughness. Similar to roughness, the waviness can be characterized by a size in each of the width x, height y and thickness z dimensions, as well as a density of the surface irregularities. Herein, the term lay refers to a direction of a predominant surface pattern, including, e.g., a patterned arrangement caused by roughness, waviness, or both.

In some embodiments, a texture defined by waviness is formed in the upper and lower texture strips 202 and 204, and then a surface roughness is formed on top of the waviness. For example, a longitudinally extending bump can extend across the texture strips 202 and 204 in the height y direction. A series of such bumps can be formed across the width x direction of the texture strips 202 and 204 to form waves. The waves can then be roughened with surface irregularities smaller than the bumps to incorporate two types of textures with height y oriented lay in the texture strips 202 and 204.

According to some embodiments, the texture can include a pattern in the roughness, waviness or lay, or combinations thereof. For example, the above described waviness from longitudinal bumps can be in a periodic pattern defined by the spacing of the bumps across the texture strips 202 and 204 in the width x direction, while the surface roughness can include zig-zag arrangements of surface irregularities to produce texture strips 202 and 204 having a compound texture pattern. However, In some embodiments, the texture can include a uniform distribution of surface irregularities to provide a texture defined by roughness according to the size, shape and density of the surface irregularities. Other combinations of surface roughness, waviness and lay are contemplated to provide texture strips 202 and 204 that uniquely identify the transaction card 20 by touch.

In some embodiments, to facilitate easy recognition by touch, the texture strips 202 and 204 have a same texture pattern that is defined by surface roughness, and not waviness or lay. While defining texture by just one of surface roughness, waviness and lay reduces the degrees of freedom for uniquely identifying a card, it also reduces complexity, making the texture easier to identify. Thus, in some embodiments, the texture strips 202 and 204 are textured to identify, e.g., the card issuer, such as, e.g., an issuing bank or financial services organization. Thus, a user can quickly and easily identify the transaction card 20 as, e.g., "the Capital One™" card in the user's selection of cards.

However, in some embodiments, the texture strips 202 and 204 can be textured based on, e.g., a type of card, such as a credit card, debit card, gift card, or other transaction card. In some embodiments, the texture strips 202 and 204 are personalized such that every transaction card 20 in the user's selection has a unique texture configuration according to the texture strips 202 and 204. Thus, the texture of the texture strips 202 and 204 may be unique to a user's selection of transaction cards 20, even though the texture may not be unique to all transaction cards 20 of all users. Furthermore, the user may customize the texture according to a desired texture pattern. For example, a user may prefer a surface roughness forming, e.g., spirals or concentric circles, on one transaction card 20, and, e.g., squares or diamonds on another.

In some embodiments, the upper texture strip 202 and the lower texture strip 204 may include the same or different textures. The combination of a texture of the upper texture strip 202 and a texture of the lower texture strip 204 may be used to identify the transaction card 20. However, in some embodiments, to facilitate quickly finding the transaction card 20, both the upper texture strip 202 and the lower texture strip 204 may have a same texture with a same pattern of texture elements, e.g., surface roughness, waviness and lay. Where the upper texture strip 202 and the lower texture strip 104 have the same texture, the texture for the transaction card 20 can be easily determine irrespective of an orientation of the transaction card 20, e.g., in a user's wallet, bag or pocket.

In some embodiments, to further facilitate quick and easy discovery of the texture strips 202 and 204, and thus quick and easy identification of the transaction card 20, the upper and lower texture strips 202 and 204 can have dimensions in the width x and height y directions that are configured to provide easy detections and sufficient space to discern the texture patterns. For example, some embodiments include an upper texture strip 202 and/or lower texture strip 204 extending across an entirety of the back face 22 with a width is the height y of a suitable size for tactile identification of the upper texture strip 202 and/or lower texture strip 204 against front face 22 using, e.g., one finger. Examples of the width may include a width in the range of between, e.g., about 1/10 inch and about 2 inches. However, other sizes are contemplated such that the texture strips 202 and 204 do not interfere with the tactile expiration date identifier 210, tactile security code 212 or the payment enabling mechanism 216. For example, because the texture can include a waviness and/or surface roughness, a texture strip overlapping the payment enabling mechanism 216 may obstruct the use of the payment enabling mechanism 216 by a payment action. Thus, the texture strips 202 and 204 may have a size and location that does not overlap with the payment enabling mechanism 216. The width x and height y of each of the upper and lower texture strips 202 and 204 may be the same or they may be different. In some embodiments, there is only an upper texture strip 202. In some embodiments there is only a lower texture strip 204. In some embodiments, there is a third, fourth, fifth, or other suitable number of texture strips in addition to the upper and lower texture strips 202 and 204.

Moreover, the texture strips 202 and 204 and the textures thereof may have a size and location that fits within a card reader that uses the payment enabling mechanism 214 to complete a transaction upon a payment action, such as insertion of the transaction card 20 into the card reader, such as, e.g., an automated teller machine (ATM), point-of-service terminal with a chip reader or magnetic strip reader, or other card reading device.

In some embodiments, there is only one texture strip, such as, e.g., only the upper texture strip 202, only the lower texture strip 204, or a texture strip that is centrally located. While the texture strips 202 and 204 are depicted as extending across the transaction card 20 in a length direction x, other embodiments include texture strips that extend across the transaction card 20 in a height y direction. Other orientations and combinations of orientations of the texture strips are contemplated to facilitate quick and efficient recognition of the identifying texture. Moreover, while the back face 22 is depicted as having all of the upper texture strip 202, expiration date identifier 206, tactile expiration date identifier 210, security code 208, tactile security code 212, lower texture strip 204 and payment enabling mechanism 214, some or all of these features may be disposed on a front face, opposite to the back face 22, or may not be present at all.

Figure 3:
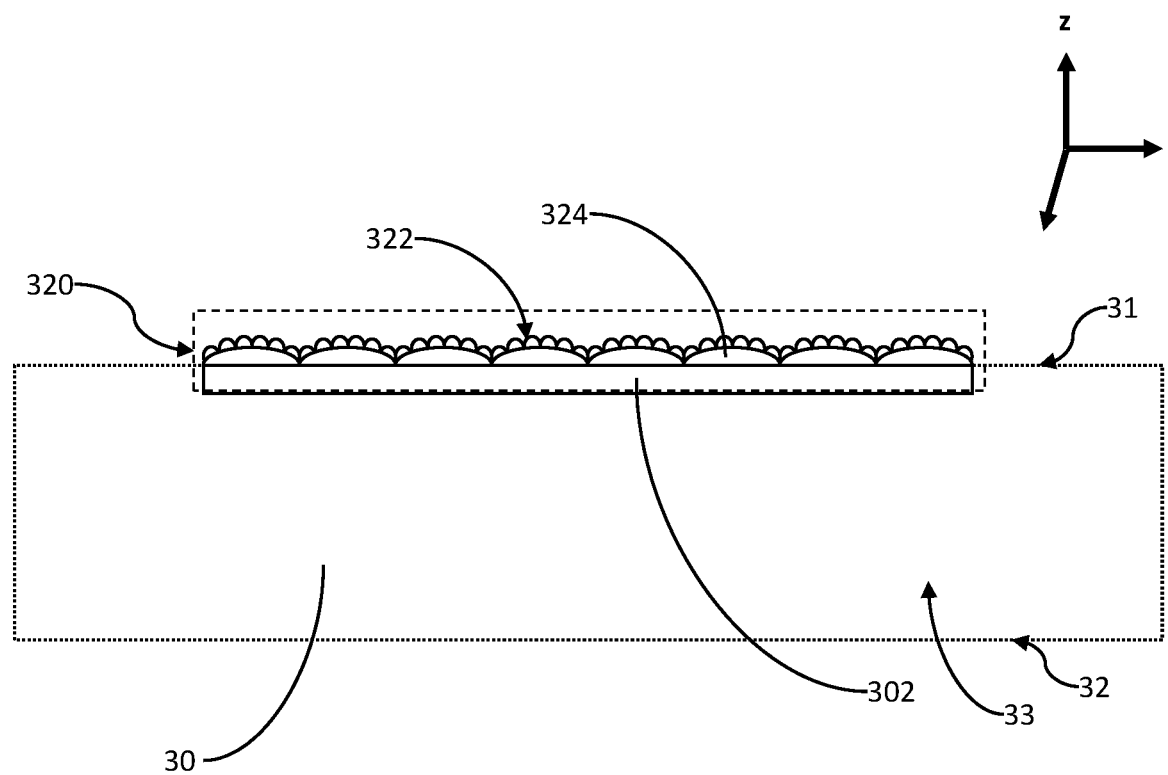

FIG. 3 illustrates a diagram of a texture strip for a transaction card with tactile identifying features in accordance with one or more example embodiments.

In an embodiment of the present disclosure, a transaction card 30 includes at least one texture strip 302 having a texture pattern 320 on a first face 31 of the transaction card 30 that is different from a base texture of a surface of the first face 31. The transaction card 30 may additionally have a second face 32 separated from the first face 31 by a body 33 of the transaction card 30. In an embodiment, the texture pattern 320 is formed on the surface of the first face 31 by an additive process to raise the texture pattern 320 above a plane formed by the surface of the first face 31 for easier discovery and recognition of the textures formed thereon. For example, the texture pattern 320 can be formed by, e.g., additive manufacturing, such as, three-dimensional (3D) printing, or by application of textured adhesives, patterning of epoxies and other liquid polymers and then curing the liquid polymer, or other additive process to form the texture pattern 320 on the first face 31.

In some embodiments, the texture strip 302 is formed from the texture pattern 320 used to identify the transaction card 30. The texture pattern 320 can be defined by one or more of various attributes related to deviations from the plane formed by the first face 31 of the transaction card 30. For example, the texture pattern 320 can include a degree of roughness, a degree of waviness, a lay, and patterns of variation thereof across the texture strip 302. Herein, the term roughness refers to total spaced surface irregularities, such as, e.g., grains 322 of material deposited on to the first face 31. The grains 322 can include a size in each of the width x, height y and thickness z dimensions, as well as a density of surface irregularities, each of which can be varied to adjust roughness. Herein, the term waviness refers to surface irregularities with a spacing greater than that of surface roughness, such as, e.g., warps, deflections, waves, among other surface deflections deposited on the first face 31 such as, e.g., bumps 324 covering a larger area than the grains 322 causing roughness. Similar to roughness, the waviness can be characterized by a size in each of the width x, height y and thickness z dimensions, as well as a density of the bumps 324. Herein, the term lay refers to a direction of a predominant surface pattern, including, e.g., a patterned arrangement caused by roughness, waviness, or both.

In some embodiments, a texture pattern 320 defined by waviness is deposited on an area of the texture strip 302, and then a surface roughness is formed on top of the waviness by depositing grains 322 on the bumps 324. For example, a bump 324 can be printed onto the area of the texture strip 302 on the first face 31, including a shape having a height in the thickness z direction, and a length and width in directions parallel to a plane of the first face 31. A series of such bumps 324 can be printed across the texture strip 302 to form a waviness pattern. The waves can then be roughened through the deposition of grains 322 smaller than the bumps 324 to incorporate two aspects of texture to form a compound texture pattern 320 from the patterns of both the bumps 324 and the grains 322.

According to some embodiments, the texture pattern 320 can include a pattern in the roughness, waviness or lay, or combinations thereof. For example, the above described waviness from bumps 324 can be in a periodic pattern defined by the spacing of the bumps 324 across the texture strip 302, while the grains 322 can be deposited in zig-zag arrangements to produce the texture strip 302 having a compound texture pattern of zig-zagging grains 322 over a uniform distribution of bumps 324. However, in some embodiments, the texture pattern 320 can include a uniform distribution of grains 322 to provide a texture defined by roughness according to the size, shape and density of the grains 322, and patterns formed thereof. In another embodiment, the texture pattern 320 can be defined by only the bumps 324 according to the size, shape and density of the bumps 324, and patterns formed thereof. Other combinations of surface roughness, waviness and lay are contemplated to provide the texture strip 302 that uniquely identify the transaction card 30 by touch.

In some embodiments, to facilitate easy recognition by touch, the texture strip 302 has a texture pattern 320 pattern that is defined by only one of, e.g., surface roughness, waviness and lay. While defining texture by just one of surface roughness, waviness and lay reduces the degrees of freedom for uniquely identifying the transaction card 30, it also reduces complexity, making the texture pattern 320 easier to identify. Thus, in some embodiments, the texture strip 302 is textured to identify, e.g., the card issuer, such as, e.g., an issuing bank or financial services organization. Thus, a user can quickly and easily identify the transaction card 30 as, e.g., "the Capital One™" card in the user's selection of cards.

However, in some embodiments, the texture strip 302 can be textured based on, e.g., a type of card, such as a credit card, debit card, gift card, or other transaction card. In some embodiments, the texture strip 302 is personalized such that every transaction card 30 in the user's selection has a unique texture configuration according to the texture strip 302. Thus, the texture pattern 320 of the texture strip 302 may be unique to a user's selection of transaction cards 30, even though the texture pattern 320 may not be unique to all transaction cards 30 of all users. Furthermore, the user may customize the texture pattern 320 according to a desired texture pattern. For example, a user may prefer grains 322 forming, e.g., spirals or concentric circles, on one transaction card 30, and, e.g., squares or diamonds on another. In some embodiments, the patterns can be formed by varying the density of, e.g., bumps 324 and grains 322 according to a predefined pattern. For example, a circular pattern can be formed by depositing greater numbers of grains 322 along a perimeter of circle on the first face 31 to alter the surface roughness to define the perimeter of a circle. Similarly, patterns can be formed from bumps 324 by increasing the concentration of the bumps 324 according to the predetermined shapes of the pattern.

In some embodiments, the texture strip 302 and the texture pattern 320 thereof may have a size and location that fits within a card reader that uses a payment enabling mechanism to complete a transaction upon insertion of the transaction card 30 into the card reader, such as, e.g., an automated teller machine (ATM), point-of-service terminal with a chip reader or magnetic strip reader, or other card reading device. Thus, a height of the texture pattern 320 in the thickness z direction can be maintained below a height above the first face 31 to facilitate insertion and removal of the transaction card 30 with respect to, e.g., a payment reader, an ATM, a wallet, or other device.

Figure 4:
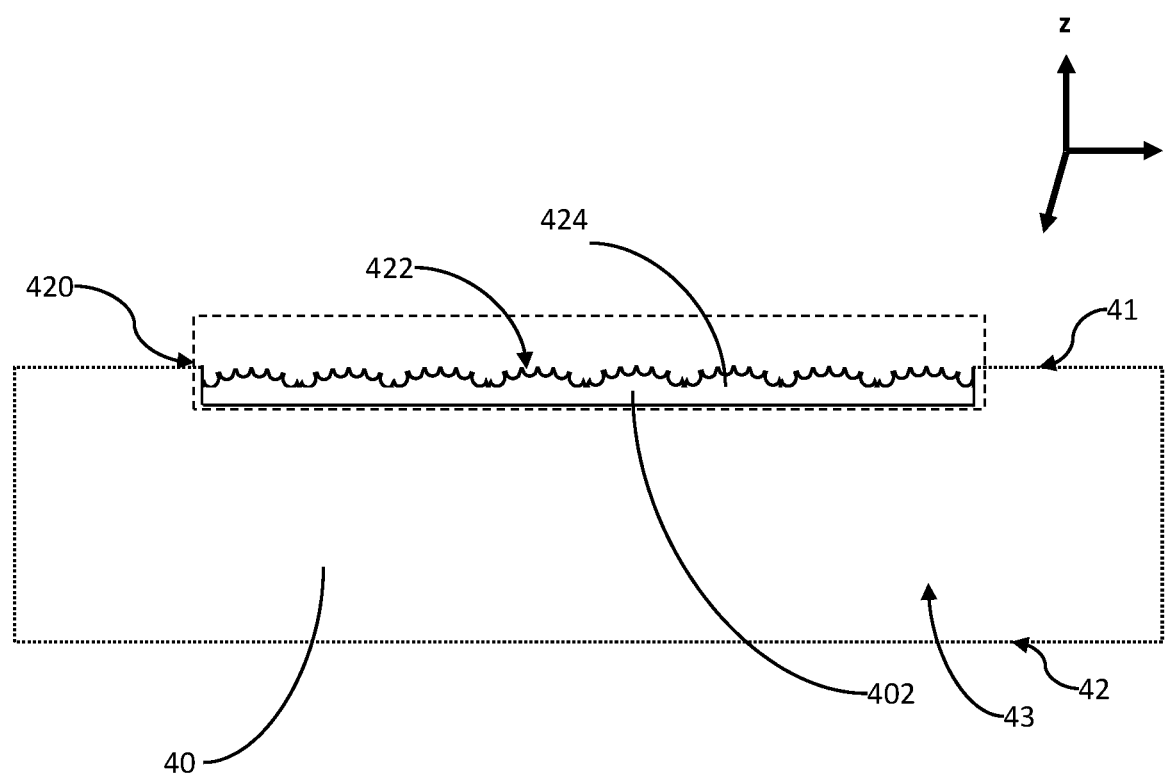

FIG. 4 illustrates a diagram of a texture strip for a transaction card with tactile identifying features in accordance with one or more example embodiments of the present disclosure.

In an embodiment of the present disclosure, a transaction card 40 includes at least one texture strip 402 having a texture pattern 420 below a surface of a first face 41 of the transaction card 40 that is different from a base texture of a surface of the first face 41. The first face 41 may be opposite to a second face 42 with respect to a body 43 of the transaction card 40. In an embodiment, the texture pattern 420 is formed in the first face 41 by a subtractive process to recess the texture pattern 420 below a plane formed by the surface of the first face 41 for easier discovery and recognition of the textures formed therein. For example, the texture pattern 420 can be formed by, e.g., etching, press molding, embossing or other subtractive process to form the texture pattern 420 below the first face 41.

In some embodiments, the texture strip 402 is formed from the texture pattern 420 used to identify the transaction card 40. The texture pattern 420 can be defined by one or more of various attributes related to deviations from the plane formed by the first face 41 of the transaction card 40. For example, the texture pattern 420 can include a degree of roughness, a degree of waviness, a lay, and patterns of variation thereof across the texture strip 402. Herein, the term roughness refers to total spaced surface irregularities, such as, e.g., dimples 422 of material etched from the first face 41. The dimples 422 can include a size in each of the width x, height y and thickness z dimensions, as well as a density of surface irregularities, each of which can be varied to adjust roughness. Herein, the term waviness refers to surface irregularities with a spacing greater than that of surface roughness, such as, e.g., warps, deflections, waves, among other surface deflections, e.g., embossed on the first face 41 such as, e.g., bumps 424 covering a larger area than the dimples 422 causing roughness. Similar to roughness, the waviness can be characterized by a size in each of the width x, height y and thickness z dimensions, as well as a density of the bumps 424. Herein, the term lay refers to a direction of a predominant surface pattern, including, e.g., a patterned arrangement caused by roughness, waviness, or both.

In some embodiments, a texture pattern 420 defined by waviness is embossed into an area of the texture strip 402, and then a surface roughness is formed on top of the waviness by etching gr dimples 422 into the bumps 424. For example, a bump 424 can be embossed into the area of the texture strip 402 on the first face 41 with a press mold, including a shape having a height in the thickness z direction, and a length and width in directions parallel to a plane of the first face 41. A series of such bumps 424 can be embossed across the texture strip 402 to form a waviness pattern. The waves can then be roughened through the etching of dimples 422 smaller than the bumps 424 to incorporate two aspects of texture to form a compound texture pattern 420 from the patterns of both the bumps 424 and the dimples 422.

According to some embodiments, the texture pattern 420 can include a pattern in the roughness, waviness or lay, or combinations thereof. For example, the above described waviness from bumps 424 can be in a periodic pattern defined by the spacing of the bumps 424 across the texture strip 402, while the dimples 422 can be etched in zig-zag arrangements to produce the texture strip 402 having a compound texture pattern of zig-zagging dimples 422 in a uniform distribution of bumps 424. However, In some embodiments, the texture pattern 420 can include a uniform distribution of dimples 422 to provide a texture defined by roughness according to the size, shape and density of the dimples 422, and patterns formed thereof. In another embodiment, the texture pattern 420 can be defined by only the bumps 424 according to the size, shape and density of the bumps 424, and patterns formed thereof. Other combinations of surface roughness, waviness and lay are contemplated to provide the texture strip 402 that uniquely identifies the transaction card 40 by touch.

In some embodiments, to facilitate easy recognition by touch, the texture strip 402 has a texture pattern 420 pattern that is defined by only one of, e.g., surface roughness, waviness and lay. While defining texture by just one of surface roughness, waviness and lay reduces the degrees of freedom for uniquely identifying the transaction card 40, it also reduces complexity, making the texture pattern 420 easier to identify. Thus, in some embodiments, the texture strip 402 is textured to identify, e.g., the card issuer, such as, e.g., an issuing bank or financial services organization. Thus, a user can quickly and easily identify the transaction card 40 as, e.g., "the Capital One™" card in the user's selection of cards.

However, in some embodiments, the texture strip 402 can be textured based on, e.g., a type of card, such as a credit card, debit card, gift card, or other transaction card. In some embodiments, the texture strip 402 is personalized such that every transaction card 40 in the user's selection has a unique texture configuration according to the texture strip 402. Thus, the texture pattern 420 of the texture strip 402 may be unique to a user's selection of transaction cards 40, even though the texture pattern 420 may not be unique to all transaction cards 40 of all users. Furthermore, the user may customize the texture pattern 420 according to a desired texture pattern. For example, a user may prefer dimples 422 forming, e.g., spirals or concentric circles, on one transaction card 40, and, e.g., squares or diamonds on another. In some embodiments, the patterns can be formed by varying the density of, e.g., bumps 424 and dimples 422 according to a predefined pattern. For example, a circular pattern can be formed by etching greater numbers of dimples 422 along a perimeter of circle on the first face 41 to alter the surface roughness to define the perimeter of a circle. Similarly, patterns can be formed from bumps 424 by increasing the concentration of the bumps 424 according to the predetermined shapes of the pattern.

While one or more embodiments of the present disclosure have been described, it is understood that these embodiments are example only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A product, comprising
a card having a front face, a back face and a payment-enabling mechanism;
wherein the front face is opposite to the back face;
account information markings disposed on the front face, the back face, or both;
wherein the account information markings comprise a tactile writing system; and
one or more card identification texture strips each comprising a strip-shaped texture region across at least a portion of the front face, the back face, or both;
wherein the one or more card identification texture strips comprises a texture filling the strip-shaped texture region that is different from a base texture of the front face, the back face, or both;
wherein the texture filling the strip-shaped texture region comprises:
i) a recession below a plane of the front face, the back face, or both, and
ii) surface protrusions extending within the recession so as to form a pattern of roughness filling the strip-shaped texture region of the one or more card identification texture strips; and
wherein the texture is unique to an issuer of the card.

2. The product of claim 1, wherein the pattern of roughness forms one or more shapes.

3. The product of claim 1, wherein the one or more card identification texture strips comprises two card identification texture strips.

4. The product of claim 3, wherein the texture of one of the two card identification texture strips is different than the texture of the other of the two card identification texture strips.

5. The product of claim 3, wherein the texture of one of the two card identification texture strips is the same as the texture of the other of the two card identification texture strips.

6. The product of claim 3, wherein the two card identification texture strips comprise:
a first card identification texture strip in an upper half of the card and extending across a width of the card; and
a second card identification texture strip in a bottom half of the card and extending across the width of the card.

7. The product of claim 1, wherein the one or more card identification texture strips consists of one card identification texture strip.

8. The product of claim 1, further comprising:
a card material forming a body of the card; and
a textured material forming the one or more card identification texture strips.

9. The product of claim 1, wherein the one or more card identification texture strips are etched into the front face, the back face, or both.

10. The product of claim 1, wherein the pattern of roughness comprises:
a plurality of raised portions that extend beyond a bottom surface of the recession; and
a plurality of recessed portions that are recessed below the bottom surface.

11. The product of claim 1, wherein at least a portion of the account information and at least a portion of at least one of the one or more card identification texture strips are co-located.

12. The product of claim 1, wherein at least one of the one or more card identification texture strips has a height less than a height of the payment-enabling mechanism.

13. A product, comprising
a card having a front face, a back face and a payment-enabling mechanism;
wherein the front face is opposite to the back face; and
two card identification texture strips each comprising a strip-shaped texture region across at least a portion of the card;
wherein the two card identification texture strips each comprise:
i) a recession below a plane of the front face, the back face, or both, and
ii) surface protrusions extending within the recession so as to form a pattern of roughness filling the strip-shaped texture region of the one or more card identification texture strips.

14. The product of claim 13, wherein the two card identification texture strips comprise:
a first texture strip in an upper half of the card and extending across a width of the card; and
a second texture strip in a bottom half of the card and extending across the width of the card.

15. The product of claim 13, wherein the two card identification texture strips are spaced apart from the payment-enabling mechanism such that a payment action is unimpeded.

16. The product of claim 13, wherein the two card identification texture strips are etched into the front face, the back face, or both.

17. The product of claim 13, further comprising account information disposed on the front face, the back face, or both, in a tactile writing system.

18. The product of claim 13, wherein the pattern of roughness comprises:
a plurality of raised portions that extend beyond a bottom surface of the recession; and
a plurality of recessed portions that are recessed below the bottom surface.

19. A method comprising:
etching a texture into one or more strip-shaped texture regions on a front face, a back face or both, of a card to form one or more card identification texture strips;
wherein the texture of the one or more strip-shaped texture regions is different from a base texture of the card, and is unique to an issuer of the card;
wherein the texture of the one or more strip-shaped texture regions each comprise:
i) a recession below a plane of the front face, the back face, or both, and
ii) surface protrusions extending within the recession so as to form a pattern of roughness filling each strip-shaped texture region of the one or more strip-shaped texture regions.

20. The method of claim 19, further comprising:

applying a texture material in each of the one or more regions; and etching the texture material to etch the texture pattern.

* * * * *